J. H. OGDEN.
Process and Apparatus for Curing Tobacco.

No. 221,854.  Patented Nov. 18, 1879.

Witnesses
William J. Cooper
Harry Smith

Inventor,
James H. Ogden
by his Attorneys
Howson and Son

UNITED STATES PATENT OFFICE

JAMES H. OGDEN, OF PHILADELPHIA, PENNSYLVANIA, ASSIGNOR TO CHARLES C. PAUL AND CHARLES J. YOUNG, OF SAME PLACE.

IMPROVEMENT IN PROCESSES AND APPARATUS FOR CURING TOBACCO.

Specification forming part of Letters Patent No. 221,854, dated November 18, 1879; application filed May 23, 1879.

*To all whom it may concern:*

Be it known that I, JAMES H. OGDEN, of Philadelphia, Pennsylvania, have invented a new and useful Improvement in Sweating and Curing Tobacco, of which the following is a specification.

The object of my invention is to effect the rapid and thorough sweating and coloring of tobacco-leaves—an object which I attain in the manner hereinafter set forth, reference being had to the accompanying drawings, in which—

Figure 1:
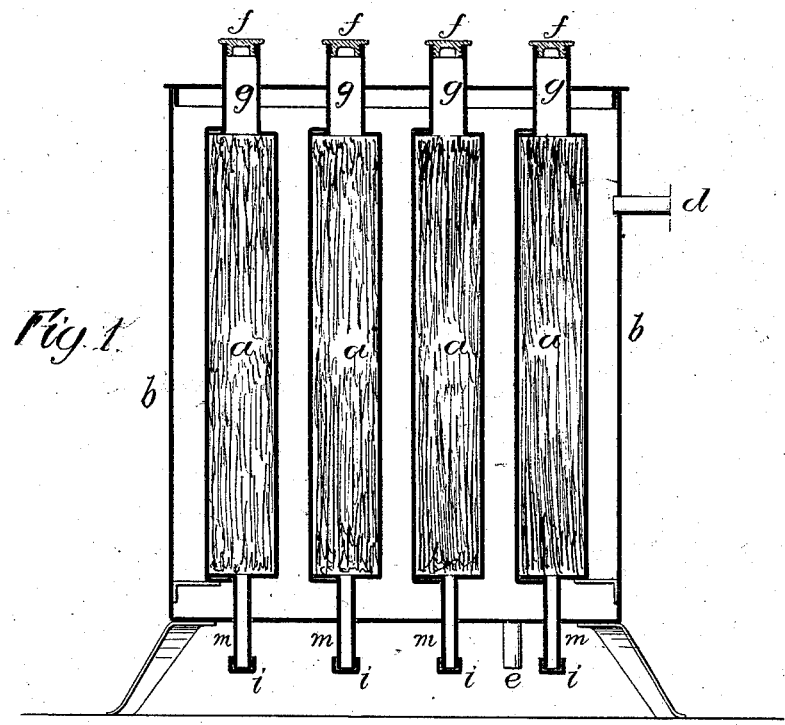
Figure 2:
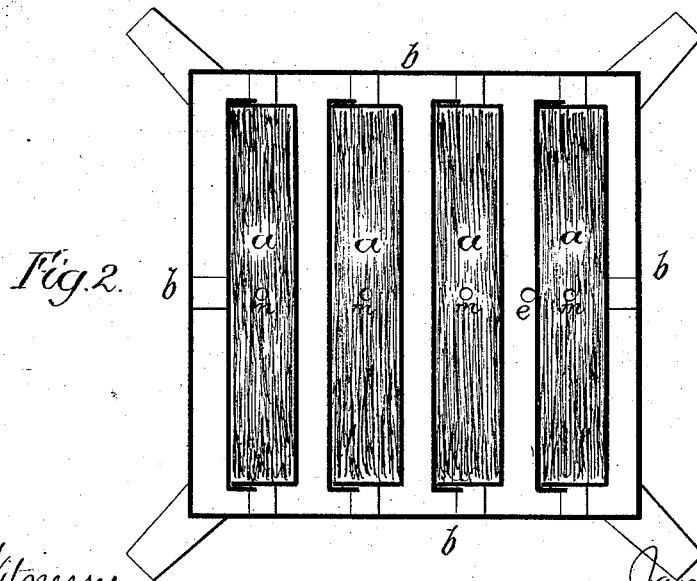

Figure 1 represents a vertical section of apparatus which I employ in carrying out my invention, and Fig. 2 a sectional plan view of the same.

Tobacco-leaves cured in the natural way—that is, by exposure to the air in a room or apartment—must be treated for several years before they acquire the dark color and fine flavor on which their value greatly depends.

The aim of my invention is to take the leaves which have been partly cured—for instance, after they have been subjected to but one season's treatment, and are of a yellowish brown color—and to so treat these leaves as to impart to them in a few hours a color and flavor which it would require years of natural curing to effect.

In carrying out the invention the leaves are first packed in shallow boxes $a$, preferably of galvanized sheet-iron, the stem portions of the leaves being arranged adjacent to the ends of the box. Covers are then applied to the boxes, and secured in such a manner that each box will be steam and water tight. A number of boxes, $a$, packed and secured in this way, are then arranged in an outer casing or box, $b$, care being taken that spaces intervene between the boxes and between each box $a$ and the outer casing, $b$. Steam is then admitted to the interior of the casing $b$ through a pipe, $d$, and this steam entirely surrounds each box $a$, the water of condensation passing off from the casing $b$ through a drip-pipe, $e$, at the bottom of the same.

When the application of heat has been continued for a sufficient time—from thirty to sixty hours usually sufficing—the screw-caps $f$ are removed from the upper ends of the tubes $g$, with which the boxes $a$ are provided, these tubes projecting through the cover of the outer casing, $b$.

The tubes $g$ being open, and the application of heat to the boxes $a$ continuing, the vapors gradually escape from the interiors of the boxes $a$, and the leaves in the same are partially dried; and in order to facilitate this operation, the caps $i$ may be removed from the tubes $m$, which project from the boxes $a$, through the bottom of the outer casing, $b$. By this means a current of warm air is allowed to pass through each box $a$, and in contact with the tobacco contained therein.

It should be understood that this operation does not take place until the curing has been completed, the sole object of this particular branch of the process being to partially dry the tobacco before its removal from the boxes $a$, so that when it is removed the leaves will not be wet, but in the proper moist and pliable condition.

Instead of the tubes $g$ and $m$ being provided with caps $f$ and $i$, ordinary valves may be used, the caps being preferred, however, on account of their simplicity and economy.

Before the leaves are packed in the boxes $a$ they should be slightly moistened. By this means the curing or sweating of the tobacco is so effected that the resultant product is of a pure and finely flavored character, and each leaf is of a uniform dark color throughout.

The object of packing the tobacco in shallow boxes and subjecting the latter to the action of steam on all sides is to insure the rapid, thorough, and uniform heating of the masses of tobacco—a result which cannot be attained where the boxes are large and deep, as in such cases the heat cannot readily penetrate the bulk of the tobacco, and the curing of the same is therefore not uniform.

I am aware that it has been proposed to cure tobacco by packing the leaves in a hermetically-closed case, and then subjecting the latter to heat; and this I do not claim, broadly; but

I claim as my invention—

1. As an improvement in sweating or curing tobacco, the mode herein described, said mode consisting in first packing the moistened leaves in a tight box, then subjecting the latter to heat, and finally permitting the vapors to escape from the box while the application of heat to the same is continued, all substantially as set forth.

2. As an improvement in sweating or curing tobacco, the mode herein described, said mode consisting in first packing the moistened leaves in a tight box, then subjecting the latter to heat, and finally passing a current of air through the box while the application of heat to the same is continued, all substantially as specified.

3. The combination of the outer box or casing, $b$, with a number of shallow boxes, $a$, arranged within said casing $b$, as described, so as to leave a space on all sides of each box, as and for the purpose set forth.

4. The combination of the outer casing, $b$, with a box or boxes, $a$, contained therein, and each provided with a tube, $g$, extending through the casing $b$, and having a screw-cap, $f$, or equivalent means of opening or cutting off communication with the interior of the box to which the tube is attached, as specified.

5. The combination of the outer casing, $b$, with a box or boxes, $a$, contained therein, and each provided with two tubes, $g$ and $m$, extending through the casing $b$, and having screw-caps or equivalent means whereby a current of air may be allowed to pass through the box to which the tubes are attached, as specified.

In testimony whereof I have signed my name to this specification in the presence of two subscribing witnesses.

JAMES H. OGDEN.

Witnesses:
WILLIAM J. COOPER,
HARRY SMITH.